United States Patent
Latulipe et al.

(10) Patent No.: US 7,063,734 B2
(45) Date of Patent: Jun. 20, 2006

(54) AIR/OIL SEPARATION SYSTEM AND METHOD

(75) Inventors: Eric Latulipe, Longueuil (CA); Richard Santerre, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 102 days.

(21) Appl. No.: 10/806,275

(22) Filed: Mar. 23, 2004

(65) Prior Publication Data
US 2005/0211093 A1  Sep. 29, 2005

(51) Int. Cl.
*B01D 45/12* (2006.01)

(52) U.S. Cl. .......................... 96/189; 55/337; 55/409; 55/428; 55/452

(58) Field of Classification Search .................. 96/188, 96/189, 190; 55/337, 400, 406, 408, 409, 55/428, 452
See application file for complete search history.

(56) References Cited

U.S. PATENT DOCUMENTS

| | | |
|---|---|---|
| 2,818,047 A | 12/1957 | Powell |
| 2,949,977 A | 8/1960 | Klompas |
| 3,378,104 A | 4/1968 | Venable |
| 3,712,032 A | 1/1973 | Obligado .................. 55/409 |
| 3,722,212 A | 3/1973 | Stein ...................... 60/39.08 |
| 4,049,401 A | 9/1977 | Smith ...................... 55/184 |
| 4,217,120 A | 8/1980 | Reynolds ................ 55/385 R |
| 4,525,995 A | 7/1985 | Clark ..................... 60/39.08 |
| 4,561,867 A | 12/1985 | Charbonnel ................ 55/202 |
| 4,600,413 A | 7/1986 | Sugden ..................... 55/207 |
| 4,714,139 A | 12/1987 | Lorenz et al. ............. 184/6.11 |
| 4,755,103 A | 7/1988 | Streifinger ................ 415/111 |
| 4,891,934 A | 1/1990 | Huelster .................. 60/39.08 |
| 5,004,407 A | 4/1991 | Hutchison |
| 5,054,583 A | 10/1991 | Wrzyszczynski ........... 184/6.26 |
| 5,714,139 A | 2/1998 | Eller |
| 5,776,229 A | 7/1998 | Blanes et al. .............. 96/188 |
| 5,863,317 A | 1/1999 | Smith et al. ............... 96/189 |
| 6,033,450 A | 3/2000 | Krul et al. ................. 55/345 |
| 6,398,833 B1 | 6/2002 | Santerre et al. ............ 55/409 |
| 6,893,478 B1 * | 5/2005 | Care et al. ................. 55/337 |

FOREIGN PATENT DOCUMENTS

CA  2425999  5/2002

* cited by examiner

*Primary Examiner*—Robert A. Hopkins
(74) *Attorney, Agent, or Firm*—Ogilvy Renault LLP

(57) ABSTRACT

A centrifugal air/oil separation system communicates with bearing cavities of the engine and substantially isolates separated oil from contacting the gearbox.

12 Claims, 4 Drawing Sheets

US 7,063,734 B2

AIR/OIL SEPARATION SYSTEM AND METHOD

FIELD OF THE INVENTION

The present invention relates to an air/oil separation system and a method of lubricating an aircraft engine using same.

BACKGROUND OF THE INVENTION

The air/oil separator described in U.S. Pat. No. 6,398,833, to Santerre et al. and assigned commonly herewith has a rotatable hollow shaft to which the air/oil separator is mounted. The air/oil mixture is collected from the main bearing cavities and delivered to the accessories gearbox (AGB) casing, before entering the air/oil separator. However, the air/oil mixture collected from the main bearing cavities of the aircraft engine is relatively hot and the temperature thereof is typically more than 400 degrees F. Heat reduces the longevity of the seals of the AGB, however, therefore, there is a need for improvement.

SUMMARY OF THE INVENTION

An object of the present invention is to provide an improved air/oil separating system.

In accordance with one aspect of the present invention, there is a method provided for lubricating an aircraft engine, comprising steps of: collecting a hot air/oil mixture from a main bearing cavity of the engine; delivering the hot air/oil mixture directly into an air/oil separating system; separating liquid oil from air contained in the air/oil mixture through the air/oil separating system; cooling the separated liquid oil; and transferring a first amount of the cooled liquid oil into the gearbox for lubrication while transferring a second amount of the cooled liquid oil to the main bearing cavity for lubrication.

In accordance with another aspect of the present invention, there is a centrifugal air/oil separation system provided substantially inside a rotatable hollow shaft disposed substantially horizontally within a gearbox of an aircraft engine. The centrifugal air/oil separating system comprises an annular separating chamber defined coaxially within the hollow shaft and adapted to rotate together with the hollow shaft. A stationary annular cavity is positioned at an end of the hollow shaft, communicating with a cavity of the engine disposed outside the gearbox, for collecting an air/oil mixture therefrom such that the air/oil mixture is substantially isolated from contacting components inside the gearbox. A mixture inlet passage is defined between the annular cavity and the annular separating chamber, permitting the air/oil mixture in the annular cavity to enter the annular separating chamber for centrifugal separation. An air outlet passage is defined through the annular cavity, communicating the annular separating chamber with outside of the engine, for discharging air separated from the air/oil mixture in the annular separating chamber. An oil outlet passage is further provided for discharging oil separated from the air/oil mixture in the annular separating chamber, into the annular cavity.

The air/oil separation system of the present invention advantageously reduces heat transfer to, for example, an accessories gearbox (AGB) in which the air/oil separating system is installed and operated, because the structure of the air/oil separating system of the present invention permits the hot air/oil mixture to be collected directly from the main bearing cavities and directly discharges the separated liquid oil and the separated air, and thus substantially isolates the hot mixture and the hot separated liquid oil from directly contacting the gears and other components of the gearbox, which results in AGB temperatures cooler than that of the prior art, thereby increasing the seal life of the AGB.

Other features and advantages of the present invention will be better understood with reference to the preferred embodiment described hereinafter.

BRIEF DESCRIPTION OF THE DRAWINGS

Reference will now be made to the accompanying drawings, in which.

DETAILED DESCRIPTION OF THE PREFERRED EMBODIMENT

Figure 1:
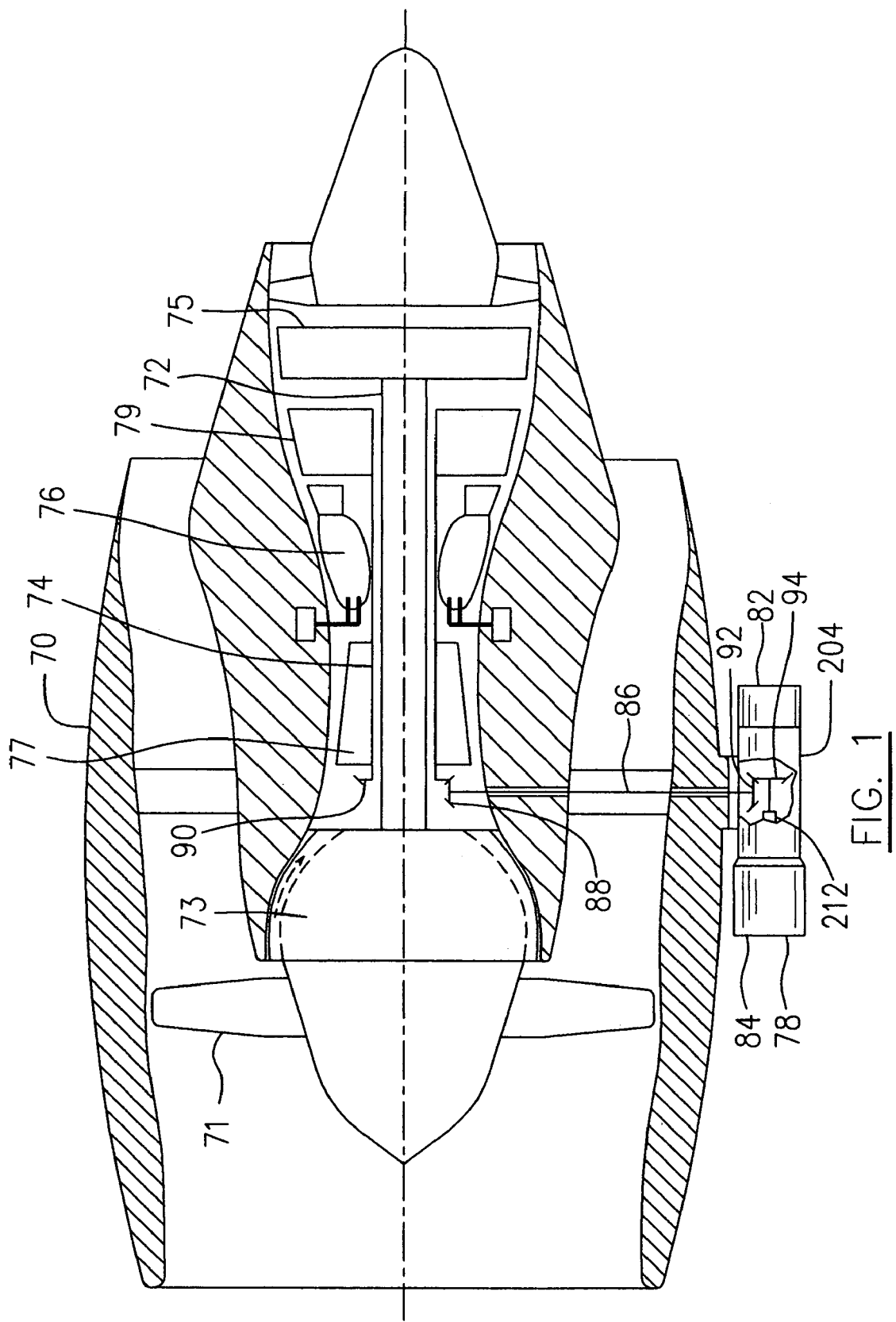
FIG. 1 is a schematic view of a bypass turbine engine incorporating one embodiment of the present invention.

A bypass gas turbine engine seen schematically in FIG. 1 which incorporates an embodiment of the present invention to illustrate as an example, the application of the present invention, includes a housing or nacelle 70, a low pressure spool assembly seen generally at 72 which includes a fan 71, low pressure compressor 73 and low pressure turbine 75, a high pressure spool assembly seen generally at 74 which includes a high pressure compressor 77, high pressure turbine 79 and a bevel gear 90, a burner seen generally at 76, and an accessory drive assembly seen generally at 78.

Accessory drive assembly 78 includes, for example, a gearbox 204 secured to a bottom mounting face of nacelle 70, a pump assembly 82 secured to an aft mounting face of gearbox 204 and a starter generator 84 secured to a forward mounting face of gearbox 204. Accessory drive assembly 78 is driven by high pressure spool 74 via an accessory shaft 86 carrying a bevel gear 88 at its upper end engaging bevel gear 90 and carrying a bevel gear 92 at its lower ed engaging a bevel gear 94 in gearbox 204. The gas turbine engine further includes a lubrication system (not shown) for lubricating and cooling the main bearings (not shown) and the gearbox 204. The lubrication system includes an air/oil separation system 212 which, for example, is installed within the gearbox 204, to recover the lubricant oil for re-use, and a scavenging system for scavenging the lubricant oil before being re-used.

Figure 2:
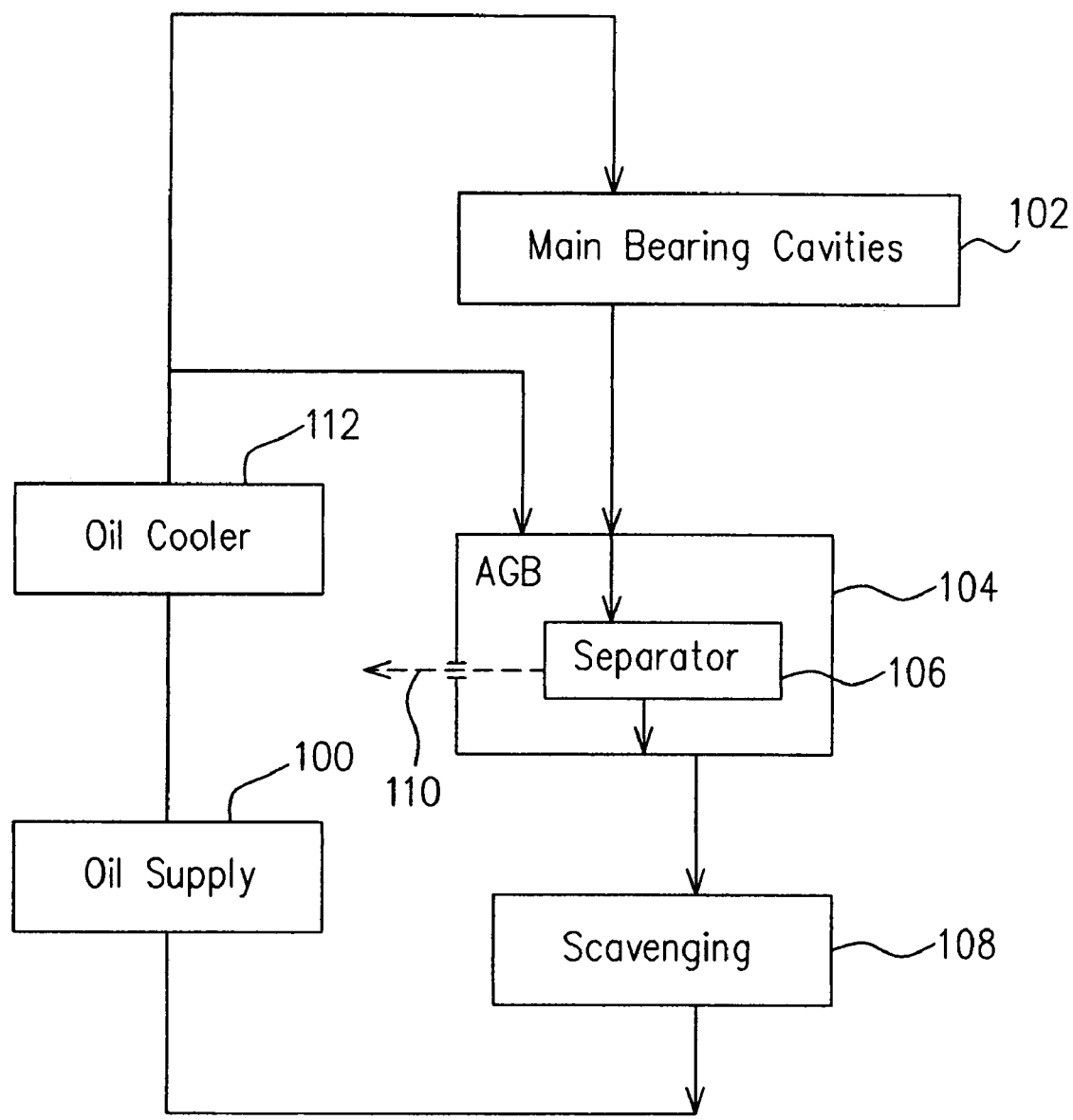
FIG. 2 is a diagram illustrating a conventional method of lubricating an aircraft engine.

Before describing the present invention, a brief description of the prior art, with reference to FIG. 2 is now given. In FIG. 2, liquid oil in an oil supply source 100 such as an oil reservoir, is conventionally directed under pressure into main bearing cavities 102 of the main shaft of the aircraft engine and an accessory gear box (AGB) 104, respectively. During the lubrication in the main bearing cavities 102, the liquid oil is mixed with the relatively hot compressed air streams used to pressure labyrinth seals of the main bearing cavities, resulting in a hot air/oil mixture because the liquid oil absorbs heat energy produced in the main bearing cavities as a result of the very high speed rotation of the main shaft of the aircraft engine, and further mixes with the relatively hot compressed air streams. In order to separate the liquid oil from air contained in the hot air/oil mixture using a centrifugal separator 106 mounted within for example, the AGB 104 (which is driven by the main shaft of the aircraft engine), the hot air/oil mixture is collected from the main bearing cavities 102 of the engine into the AGB 104 in which the hot air/oil mixture reaches the inlet of the centrifugal separator 106. Liquid oil contained in the air/oil mixture in the centrifugal separator 106, is under centrifugal forces and is discharged to the inside of the AGB 104, after which it accumulates at a lower portion of the AGB 104, and is then delivered to a scavenging system 108. Air contained in the air/oil mixture in the centrifugal separator 106 under the pressure differential is discharged through a passage (as indicated by the broken line arrow 110), which is isolated from the inside of the AGB 104, to outside of the engine. The recovered liquid oil after the scavenging process, is returned to the oil supply source 100. The liquid oil immediately after separation from the hot air/oil mixture, is still relatively hot, and then becomes much cooler after the scavenging process and by being mixed with the liquid oil stored in the oil supply source 100. This cooling step is indicated by block 112, which does not necessarily indicate a specific oil cooling device.

Figure 3:
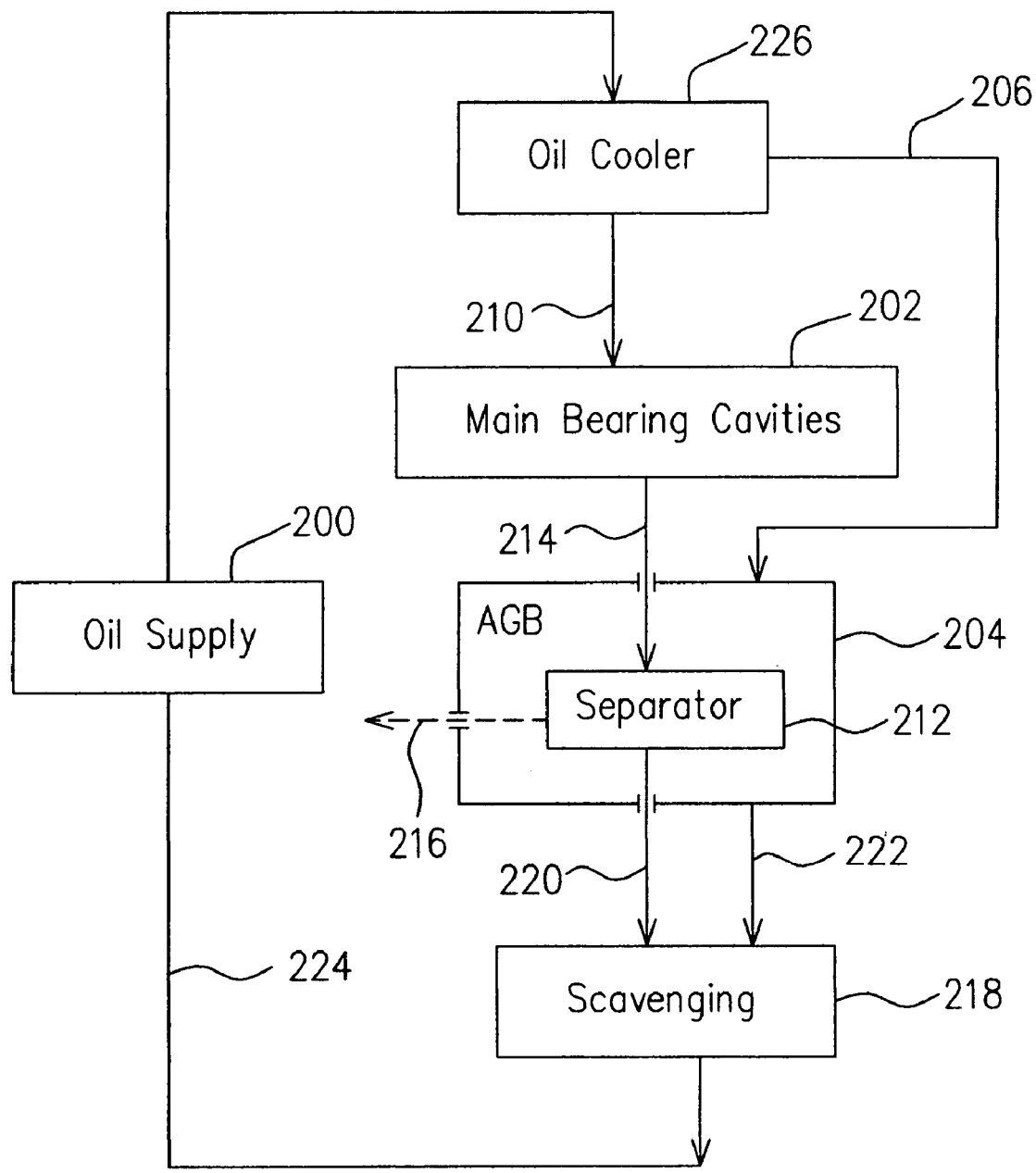
FIG. 3 is a diagram illustrating a method of lubricating an aircraft engine in accordance with the present invention.

In FIG. 3, a diagram illustrates a method according to the present invention for lubricating an aircraft engine. Relatively cool liquid oil is contained in an oil supply source 200, for example, an oil reservoir. A first amount of the cool liquid oil is transferred directly to a gearbox of the aircraft engine, for example, an accessories gearbox (AGB) 204, as indicated by the arrowed line 206. The first amount of the cooled liquid oil enters the casing of the AGB 204 and lubricates the gears and other components (not shown) of the AGB 204 by any suitable means, such as splashing disk. A second amount of the cool liquid oil is transferred from the oil supply source 200 to the main bearing cavities 202 of the main shaft of the aircraft engine, for lubricating and cooling the bearings around the main shaft of the aircraft engine, as indicated by the arrowed line 210. In the main bearing cavities 202, the cool liquid oil becomes a relatively hot air/oil mixture because of heat energy produced by the high-speed rotation of the bearings and the main shaft of the aircraft engines, and because of the relatively hot compressed air streams used to pressure labyrinth seals, which enters the main bearing cavities 202, resulting in aeration of the liquid oil in the main bearing cavities 202. The relatively hot air/oil mixture is collected from the main bearing cavities 202 and delivered into a air/oil separation system 212 disposed inside the AGB 204. The air/oil separation system 212 is preferably defined within a rotatable hollow shaft of the AGB 204 in order to create centrifugal forces for separation of the respective liquid oil and air contained in the hot air/oil mixture. The delivery of the hot air/oil mixture from the main bearing cavities 202 is conducted, as indicated by the arrowed line 214, such that the hot air/oil mixture is delivered directly into the air/oil separation system 212 and is isolated from contacting the gears and other components of the AGB 204, in order to reduce or minimize heat transfer from the hot air/oil mixture to the AGB 204. The air/oil separation system 212 is specifically configured for such an application and will be described in detail with reference to FIG. 4 hereinafter.

The air separated from the hot air/oil mixture in the air/oil separation system 212, is discharged through a passage indicated by the arrowed broken line 216 out of the AGB 204 and finally to outside of the engine. The liquid oil separated from the hot air/oil mixture in the air/oil separation system 212 is still relatively hot and therefore is collected and discharged in an isolated condition relative to the AGB 204, to an oil scavenging system 218 as indicated by the arrowed line 220.

The first amount of the cool liquid oil having entered the AGB 204 and having lubricated the gears and other components of the AGB 204 is collected in a lower portion of the casing of the AGB. During the lubrication of the gears and other components of the AGB 204 the liquid oil within the casing of the AGB 204 is not substantially aerated because there is no compressed airflow acting on the liquid oil for the lubrication in the casing of the AGB 204. The liquid oil collected in the lower portion of the AGB 204 is somewhat warmer than the cool liquid oil in the oil supply source 200 but is cooler than the liquid oil separated from the hot air/oil mixture in the air/oil separation system 212, and is then delivered to the oil scavenging system 218 as indicated by the arrowed line 222. The oil scavenging system 218 processes the liquid oil collected from both the air/oil separation system 212 and the casing of the AGB 204 in a manner well known in the art, and the recovered clean liquid oil is then returned from the oil scavenging system 218 to the oil supply source 200 for further use, as indicated by the arrowed line 224. The liquid oil is cooled before re-entering the circuit for lubricating and cooling the one or more main bearing cavities 202 and the AGB 204. The cooling process, as indicated by the block 226, may be conducted by any suitable means for cooling which is connected after the oil supply source 200, or may be naturally achieved during the oil scavenging process and more particularly within the oil supply source 200 when being mixed with a greater amount of cool liquid oil contained within the oil supply source 200.

Figure 4:
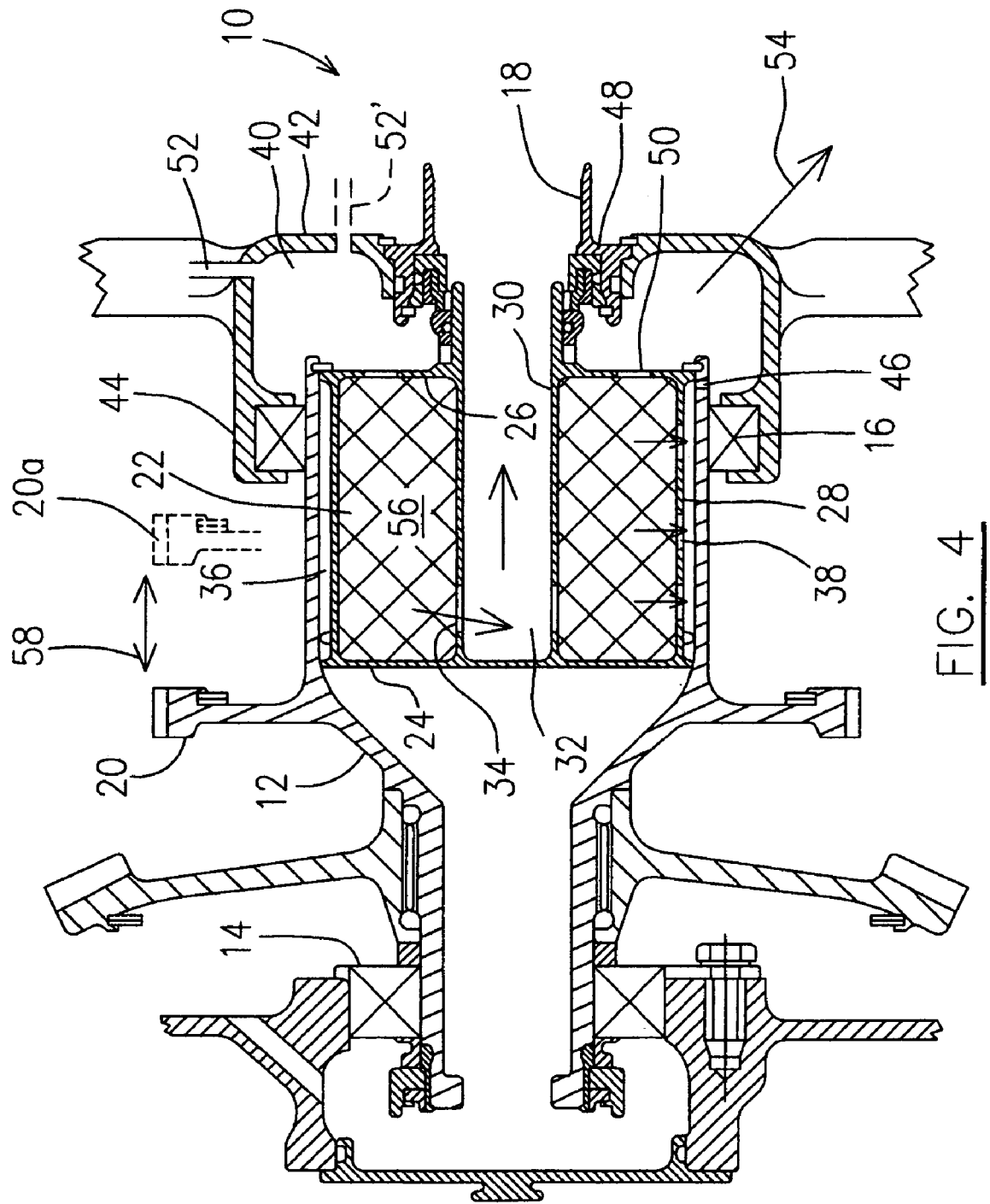
FIG. 4 is a longitudinally cross-sectional view of an air/oil separation system incorporated in a hollow shaft of an accessories gearbox according to one preferred embodiment of the present invention.

FIG. 4 illustrates an embodiment of the present invention which is specifically configured for use in the method of the present invention illustrated in FIG. 3, functioning as the air/oil separation system 212 in FIG. 3. The embodiment of the present invention shown in FIG. 4 generally includes a centrifugal separation system, indicated by numeral 10 which is substantially defined within a hollow shaft 12 of a gearbox, such as an accessory gearbox of an aircraft jet engine (not shown). The hollow shaft 12 is substantially horizontally disposed and rotatably supported in bearings 14 and 16, and is driven from a main shaft (not shown) of the engine by way of gear 20.

An annular separating chamber 22 is coaxially and sealingly mounted within the hollow shaft 12 at one end thereof, and includes first and second radial walls 24, 26 which are axially spaced apart from each other. A cylindrical exterior wall 28 extends between the first and second radial walls 24, 26, and a cylindrical interior wall 30 extends from the first radial wall 24 through a central opening (not indicated) of the second radial wall 26, thereby defining the annular separating chamber 22 between the first and second radial walls 24, 26 and between the exterior and interior walls 28, 30, as well as defining an axial central passage 32 within the cylindrical interior wall 30. A plurality of openings 34 are defined in the cylindrical interior wall 30, preferably located at the end thereof close to the first radial wall 24 such that the central axial passage 32 is in fluid communication with the annular separating chamber 22.

The cylindrical exterior wall 28 is preferably radially spaced apart from the interior of the hollow shaft 12, thereby defining an annular passage 36 between the interior of the hollow shaft 12 and the cylindrical exterior wall 28 of the annular separating chamber 22. The first and second radial walls 24, 26 preferably have a diameter substantially equal to the diameter of the interior of the hollow shaft 12 such that the annular passage 36 is closed at opposite ends thereof by the respective radial walls 24, 26. A plurality of openings 38 permit fluid flow from the annular separating chamber 22 to the annular passage 36. Preferably, seals (not shown) are provided at least at one end of the annular passage 36 proximate to the first radial wall 24 in order to prevent fluid leakage from the annular separating chamber 22 and the annular passage 36 into the remaining section of the hollow shaft 12.

The hollow shaft 12 preferably includes a diametrically enlarged section, as illustrated in FIG. 4, for accommodation of the annular separating chamber 22. In order to provide a suitable capacity for the separating process.

The annular separating chamber 22 is mounted within the hollow shaft 12 in a suitable manner such that the annular separating chamber 22 is restrained from rotation relative to the hollow shaft 12, thus the annular separating chamber 22 rotates together with the hollow shaft 12 when the hollow shaft 12 is driven to rotate by the main shaft of the aircraft engine.

The centrifugal air/oil separation system 10 further includes a stationary annular cavity 40 which can be either supported by a structure within the accessory gearbox or integrated into the structure of the casing of the accessory gearbox. The annular cavity 40 is positioned at the end of the hollow shaft 12 where the annular separating chamber 22 is mounted. The annular cavity 40 preferably includes a side radial wall 42 and an exterior cylindrical wall 44. The exterior cylindrical wall 44 has a diameter greater than the diameter of the enlarged section of the hollow shaft 12 which contains the annular separating chamber 12, and extends over an end portion of the enlarged section of the hollow shaft 12 such that the bearing 16 is accommodated in the annular space defined between the hollow shaft 12 and the stationary annular cavity 40. Therefore, the hollow shaft 12 is rotatably supported at its end by the stationary annular cavity 40. The end portion of the hollow shaft 12 extends into the annular cavity 40 such that a plurality of holes 46 defined in the hollow shaft in the end portion thereof communicate the annular cavity 40 with the annular passage 36.

The cylindrical interior wall 30 of the annular separating chamber 22 which extends from the first radial wall 24 through the central opening of the second radial wall 26, further extends into the stationary annular cavity 40 to form a part or entire interior of the annular cavity 40. The side radial wall 42 of the stationary annular cavity 40 defines a central opening (not indicated) sized and configured to accommodate a seal assembly 48 around the extension of the cylindrical interior wall 30 of the annular separating chamber 22, thereby completing the enclosure of the annular cavity 40 without interfering with the rotation of the annular separating chamber 22 together with the hollow shaft 12. The seal assembly 48 may further include appropriate structures such as an outlet nozzle 18, if required, to be connected with for example, a tube (not shown) for discharging clean air out of the aircraft engine.

A plurality of openings 50 are defined in the second radial wall 26 which is adjacent to the annular cavity 40, communicating the annular cavity 40 with the annular separating chamber 22 in order to permit the hot air/oil mixture to flow into the inside of the annular separating chamber 22. A tube 52 is connected to the annular cavity 40 and in fluid communication with the inside of the annular cavity 40, and for example, the main bearing cavities (not shown) of the aircraft engine where the hot air/oil mixture is generated. The tube 52 is connected preferably tangentially with the cylindrical wall 44 of the annular cavity 40 (but could also be in the side radial wall 42, as shown in dotted outline at 52') in a location such that the hot air/oil mixture from the bearing cavities flows in a substantially axial direction through the annular cavity 40 and then enters the openings 50 in the second radial wall 26 of the annular separating chamber 22. A liquid oil outlet (not shown, but indicated by the arrow 54) is defined in either the side wall 42 or the cylindrical exterior wall 44, but preferably in a lower location of the annular cavity 40, and is connected to an oil scavenging system (not shown) to discharge the liquid oil collected in the annular cavity 40 into the oil scavenging system for further processing.

Inside the annular separating chamber 22 there is provided a packing 56 snugly fitted between and frictionally engaging the exterior and interior cylindrical walls 28, 30 such that the assembly of the annular separating chamber 22 is secured together. The packing 56 includes a permeable and substantially rigid matrix material, such as the product Retimet™ made by the Dunlop Company Ltd. However, the matrix material could be formed of any suitable mesh material, for example, wire gauze, expanded mesh, a plurality of pieced plates, or alternatively, a bristle structure. The essential feature of the matrix is that it should provide both axial and radial passages therethough, as well as a relatively large surface area of the passages on which oil particles can be collected so that oil can migrate radially outwards and air can migrate radially inwards, while the air/oil mixture travels axially through the matrix.

Details of the packing 56 and other features of the annular separating chamber 22 are described in U.S. Pat. No. 6,398,833, the entire specification of which is incorporated herewithin by reference. The present invention, in this aspect, involves the installation of the annular separating chamber 22 into the hollow shaft 12, the hollow shaft 12 therfore substantially incorporating the centrifugal air/oil separation system 10. As shown in FIG. 4, the section of the hollow shaft 12 at the end wherein the annular separating chamber 22 is installed, is enlarged to a diameter relative to the remaining section of the hollow shaft 22, in order to accommodate the annular separating chamber 22 therein. Nevertheless, the diameter of the enlarged section of the hollow shaft 12 is preferably limited to a size, if an annular separating chamber providing the required air/oil separation capacity can be accommodated therein, such that the gear 20 can be mounted to the enlarged section of the hollow shaft 12, as indicated by numeral 20a, resulting in, for example, an accessory gearbox housing shortened by a distance indicated by double arrow 58. This minimizes possible interference between accessories and other engine parts.

In operation, the air/oil mixture generated in the one or more main bearing cavities enters the stationary annular cavity 40 through the tube 52. The air/oil mixture is substantially in a gaseous state with fine oil particles suspended therein, and therefore a substantial portion of the air/oil mixture will flow in a substantially axial direction into the openings 50 of the annular separating chamber 22, while a minor portion of the air/oil mixture fills the inside space of the annular cavity 40, and eventually enters the openings 50. The air/oil mixture passes axially through the packing 56 while the packing 56 rotates together with the annular separating chamber 22 and the hollow shaft 12. While the mixture is traveling axially through the packing 56, the oil particles in the mixture are collected by the large surface area of the passages formed inside of the packing 56. The oil particles collected on the surface areas of the packing 56 are then forced under centrifugal forces to travel radially and outwardly to pass through the openings 38 in the cylindrical exterior wall 28 and arrive in the annular passage 36. The liquid oil collected in the annular passage 36 is further pushed through the annular passage 36 and exits therefrom through the plurality of holes 46 in the hollow shaft 22, to enter the annular cavity 40. The liquid oil together with the hollow shaft 22, in rotation, is splashed under its inertia onto the inner surface of the annular cavity 40, and mostly on the inner surface of the exterior cylindrical wall 44 thereof, when entering the stationary annular cavity 40. The liquid oil splashed on the inner surface of the annular cavity 40, is eventually collected under gravity in a lower location within the annular cavity 40, where is taken away through the oil outlet 54, by the oil scavenging system. The air contained in the mixture while traveling axially through the rotating packing 56, flows radially inwardly under the pressure differential, and then through the openings 34 in the interior cylindrical wall 30 to enter the central axial passage 32 to be discharged to outside of the engine.

The internal installation of the separating chamber in the hollow shaft advantageously prevents liquid oil in the accessory gearbox for lubrication and cooling, from splashing on the annular separating chamber to block the passages of the packing therein because all inlets and outlets of the annular separating chamber are protected by either the hollow shaft or the walls of the annular cavity. Therefore, the separation efficiency of the system is assured and improved.

Modifications and improvements to the above-described embodiments of the present invention may become apparent to those skilled in the art. For example, any suitable method of air/oil separation may be employed, making such modifications as well be apparent to the skilled reader. Also, some elements may be added or subtracted from the system described without departing from the scope of the invention disclosed. Similarly, placement of certain elements of the invention such as the separator, in the engine AGB are not critical to the disclosed functionality, and thus not essential to the invention disclosed. The foregoing description is intended to be exemplary rather than limiting. The scope of the present invention is therefore, intended to be limited solely by the scope of the appended claims.

We claim:

1. A centrifugal air/oil separation system substantially positioned inside a rotatable hollow shaft of an engine disposed substantially horizontally the system comprising:
   an annular separating chamber defined co-axially within and radially spaced from the hollow shaft and adapted to rotate together with the hollow shaft;
   a stationary annular cavity positioned at an end of the hollow shaft, communicating with a cavity of the engine disposed outside a gearbox, for collecting an air/oil mixture therefrom such that the air/oil mixture is substantially isolated from contacting components inside the gearbox;
   a mixture inlet passage defined between the annular cavity and the annular separating chamber, permitting the air/oil mixture in the annular cavity to enter the annular separating chamber for centrifugal separation;
   an air outlet passage defined through the annular cavity, communicating the annular separating chamber for discharging air separated from the air/oil mixture in the annular separating chamber; and
   an oil outlet passage for discharging liquid oil separated from the air/oil mixture in the annular separating chamber into the annular cavity.

2. A centrifugal air/oil separation system as claimed in claim 1 wherein the annular separating chamber is sealingly mounted within the hollow shaft, forming an annular passage defined between an interior of the hollow shaft and an exterior wall of the annular chamber, the annular passage being in communication with the annular separating chamber and the annular cavity, and forming a part of the oil outlet passage.

3. A centrifugal air/oil separation system as claimed in claim 2 wherein the annular separating chamber comprises a plurality of openings defined in the exterior wall thereof such that the liquid oil in the annular separating chamber under centrifugal forces enters the annular passage through the openings during rotation of the hollow shaft.

4. A centrifugal air/oil separation system as claimed in claim 1 wherein the hollow shaft is rotatably supported at the end thereof by the stationary annular cavity, and an end portion thereof extends axially into the annular cavity.

5. A centrifugal air/oil separation system as claimed in claim 4 wherein the hollow shaft comprises a plurality of holes defined in the end portion thereof extending into the annular cavity such that the liquid oil in an annular passage under centrifugal forces enters the annular cavity during rotation of the hollow shaft.

6. A centrifugal air/oil separation system as claimed in claim 1 wherein the air outlet passage comprises a central axial passage defined within an interior wall of the annular separating chamber and a plurality of openings defined in the interior wall.

7. A centrifugal air/oil separation system as claimed in claim 6 wherein the interior wall extends axially into the annular cavity; forming at least a part of an annular interior of the annular cavity.

8. A centrifugal air/oil separation system as claimed in claim 6 wherein the openings defined in the interior wall of the annular separating chamber are located at an end distal from the annular cavity.

9. A centrifugal air/oil separation system as claimed in claim 1 wherein the air/oil mixture inlet passage comprises a plurality of openings defined in a radial wall of the annular separating chamber adjacent to the annular cavity.

10. A centrifugal air/oil separation system as claimed in claim 1 wherein the annular separating chamber comprises a packing disposed therein and adapted to rotate together with the annular separating chamber, the packing having a substantially rigid matrix adapted to inhibit collapse under centrifugal forces during rotation thereof, the matrix defining a plurality of flow passages permeable to the liquid oil and air for both axial and radial movement of the liquid oil and air therethrough.

11. A centrifugal air/oil separation system as claimed in claim 1 wherein the annular cavity comprises an outlet defined in a lower location of the annular cavity and being adapted for connection of a scavenging system.

12. A centrifugal air/oil separation system as claimed in claim 1 wherein the annular cavity comprises an inlet defined in one of a side wall and the cylindrical wall of the annular cavity and being adapted for connection of the cavity of the engine such that when the air/oil mixture from the cavity of the engine flows through the inlet into the annular cavity, the air/oil mixture is directed in a substantially axial direction through the annular cavity and the mixture inlet passage into the annular separating chamber.

* * * * *